Dec. 16, 1958

A. MACKIE 2,864,633

METHODS AND APPARATUS FOR ANCHORING PIPE LINES AND THE LIKE

Filed Feb. 23, 1956

INVENTOR.
ALEX MACKIE
BY
ATTY.

Dec. 16, 1958 A. MACKIE 2,864,633
METHODS AND APPARATUS FOR ANCHORING
PIPE LINES AND THE LIKE
Filed Feb. 23, 1956 2 Sheets-Sheet 2

INVENTOR.
ALEX MACKIE

BY *Robert H Wendt*

ATTY.

United States Patent Office 2,864,633
Patented Dec. 16, 1958

2,864,633

METHODS AND APPARATUS FOR ANCHORING PIPE LINES AND THE LIKE

Alex Mackie, Centralia, Mo., assignor to A. B. Chance Company, Centralia, Mo., a corporation of Missouri Application February 23, 1956, Serial No. 567,366

2 Claims. (Cl. 287—117)

The present invention relates to methods and apparatus for anchoring pipes and the like, and is particularly concerned with such methods and apparatus for preventing the shifting of submerged pipes that is brought about by expansion and contraction and the fact that pipe lines extend up and down hill and are also curved, which might cause the movement of the pipe line to pull it out of the earth.

For example, a pipe line which extends into a valley from two high points might be subjected to a contracting force that would lift the pipe in the valley and tend to dislodge it from its covering of earth, or a pipe line which extends about a curve, or is anything but straight, may have the curved portions thereof dislodged from its intended position by alternate expansion and contraction of the pipe.

One of the objects of the invention is the provision of improved methods and apparatus of anchoring pipe lines and of installing anchoring means for pipe lines by means of which the tight engagement of the anchor with the pipe line may be adjusted so as to render the anchor effective without placing undue strain upon the pipe line.

Another object of the invention is the provision of improved methods and apparatus for anchoring pipe lines or the like, which permits the pipe line to expand or contract relative to the anchoring means, where a sliding movement is permitted, while at the same time the pipe line is held tightly in its submerged position so that the pipe cannot be dislodged by natural forces.

Another object of the invention is the provision of an improved anchor rod installation of the screw type in which the upper end of the anchor rod is threaded so that nuts or other threaded members may be used to draw an anchoring bracket tightly against the pipe, and in which special provision is made for adapting the thread on the anchor rod to the configuration of a wrench or power device chuck or driving head so that the screw anchors may be installed without damaging the threaded portion of the anchor rod.

Another object of the invention is the provision of an improved wrench or torque adapter for the threaded end of a guy rod and anchor of the screw type, which device is adaptable to be used with various makes and types of manual or power impact wrenches or torque devices.

Another object of the invention is the provision of an improved adapter for the threaded end of a guy rod, which is constructed and arranged to be secured tightly to the threaded end in such manner as to be used as a driver to be engaged by a wrench or torque device, driving the anchor from its threaded end, but in which the adapter may be removed from the guy rod after being used to drive the guy rod to relieve the locking forces that are created by the torque on the anchor rod.

Another object of the invention is the provision of an improved torque adapter to be used with threaded anchor rods and screw anchors having means for locking the adapter on the threaded end of the anchor rod, and also having means for releasing the adapter from the anchor rod when the driving function has been accomplished by means of a power impact wrench, a manual wrench, or other torque device.

The primary function of the anchors is to hold down the pipe against the force of buoyancy in all periodically flooded areas. There is a great tendency for pipelines, especially sizes eight inches and larger in diameter, to float up in very light soil and for the first year or two in all soil, when the back-fill soil over the pipe has not packed firmly and absorbs a great deal of water.

Also a necessary application of the anchors is to arrest expansion and contraction movement of the pipelines at critical points, such as approaches to pressure stations, branch line junctions, and valves. The use of anchors assures the expansion and contraction to be absorbed at curves in the pipe, built in for that purpose.

The need for anchoring has increased due to the generally longer lines now being laid and also because pumping facilities are being added to previously laid lines and increasing the pressure at which the line is operated. This increase in pressure is to increase the volume which can be transported through the pipe. Lines operated at high pressures transmit the pulsation set up by the pumps which adds to the tendency of the pipe coming out of the ground.

Other objects and advantages of the invention will be apparent from the following description and the accompanying drawings, in which similar characters of reference indicate similar parts throughout the several views.

Referring to the two sheets of drawings accompanying this application,

Figures 1, 2:
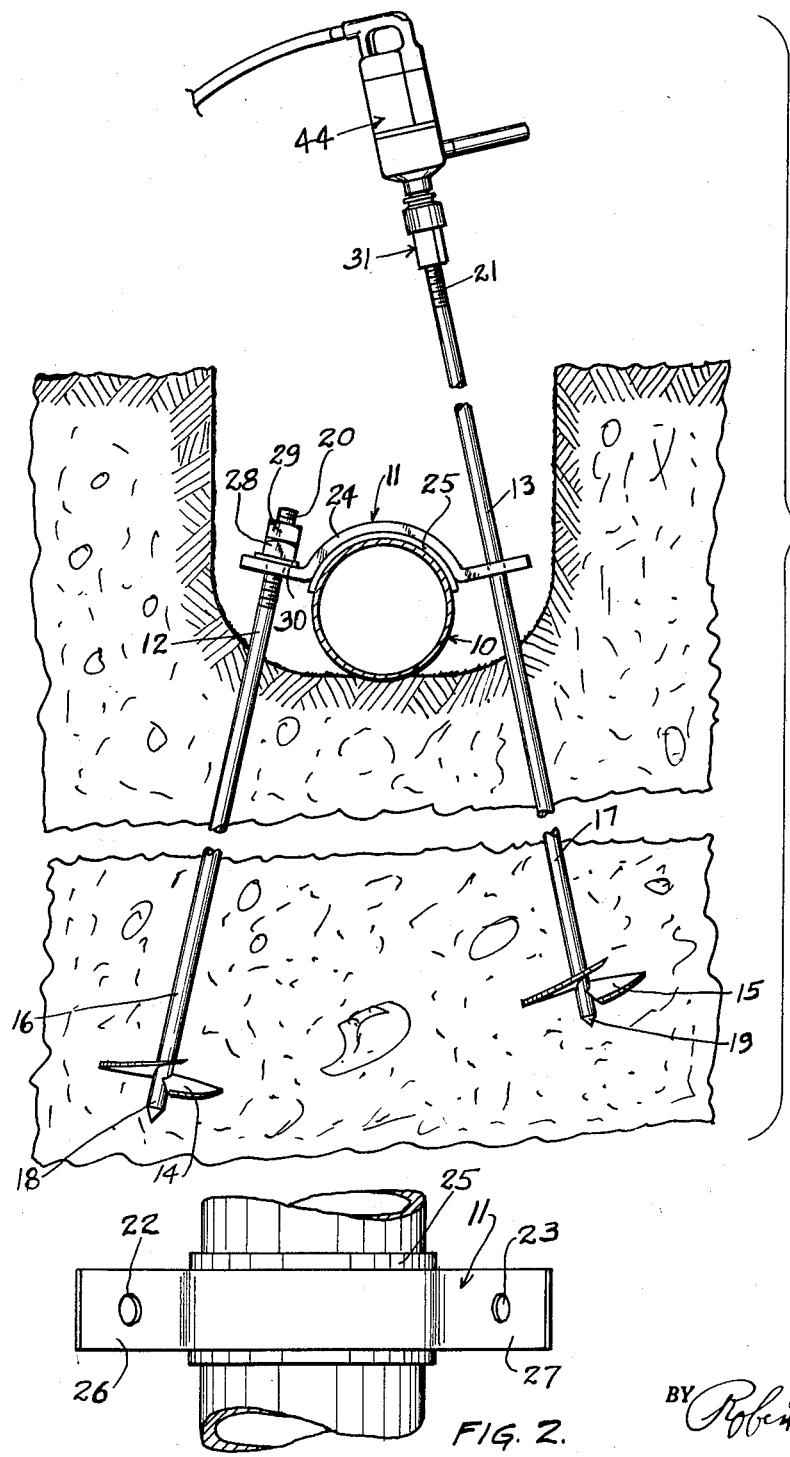
Fig. 1 is a fragmentary vertical sectional view, showing a pipe line anchor installation in the course of being installed by means of a pneumatic impact torque wrench.
Fig. 2 is a fragmentary top plan view of a short portion of the pipe line with the anchoring bracket taken from the top of Fig. 1, with the anchors removed.
Figure 3:
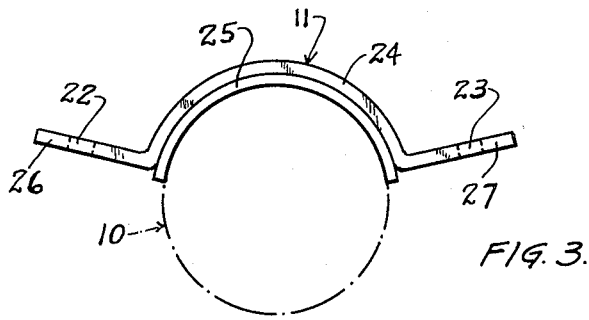
Fig. 3 is an end view of the pipe line bracket taken from the bottom of Fig. 2.

Referring to Fig. 1, 10 indicates the pipe line, which is shown in section, and which is to be anchored in place by means of the anchor bracket 11 and a pair of anchor assemblies 12, 13 of the screw type. Each anchor assembly 12, 13 includes the screw anchor 14 or 15 integrally attached to the lower end of the anchor rod 16, 17, which has a pointed extension 18, 19, below each anchor for guiding the anchor in its installation.

The anchor rods 16, 17 may be of any required length for the particular installation; and they are provided with upper threaded ends 20, 21 passing through the apertures 22, 23 of the anchor bracket 11. The apertures 22, 23 have a suitable clearance around the rods 12, 13 so that the rods may tilt at various angles, approximating that shown in the drawing, without involving difficulties in the location of the bracket over the ends of the rods.

The anchor bracket 11 preferably comprises a thick rectangular strap of suitable metal, such as steel, having a cylindrically curved portion 24, which may be of substantially the same radius as the outside of the pipe 10; and a partially cylindrical pad 25 is preferably provided between the pipe and the bracket for giving the bracket an extended area of contact with the pipe and protecting the pipe against wear.

The partially cylindrical portion 24 has a pair of radially extending attaching flanges 26 and 27, each of which is provided with an aperture 22, 23 for the anchor rod.

Figure 4:
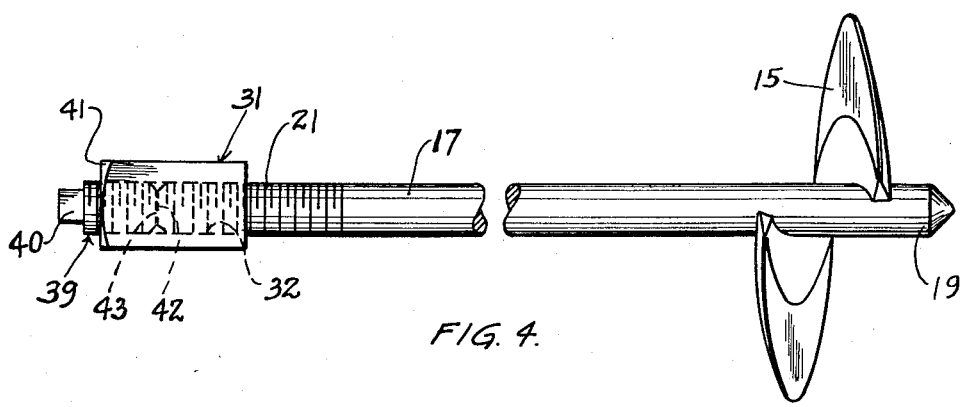
Fig. 4 is a side elevational view of a screw anchor having a threaded anchor rod and provided with a driving adapter to be used with various types of wrench sockets.
Figure 5:
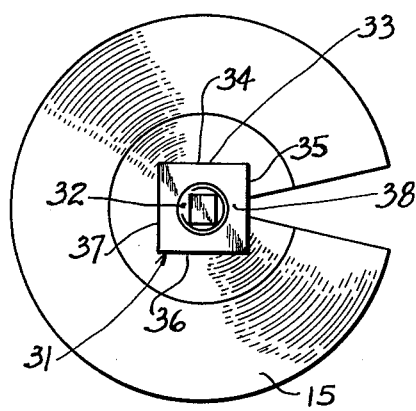
Fig. 5 is an end view taken from the left side of Fig. 4.

Referring to Figs. 1, 4, and 5, each anchor rod 16 or 17 is provided with a threaded outer end portion 20 or 21 for receiving the securing and locking nuts 28, 29, which are installed on the threaded end 20 with a washer 30.

The upper nut 29 acts as a lock nut; and various types of nuts may be employed. In an alternative form of installation one of the nuts 28 may be placed on the lower side of the bracket, clamping the bracket flange 26 between them, and preventing the bracket from moving up or down relative to the rod.

The left side of Fig. 1 shows one of the rods 16 fully installed, while the right side shows the rod 17 in the course of being used for installing the anchor 15.

The sequence of events in the installation of the anchors may be varied, as both rods may be driven first and then bent apart to install the anchor plate, the clearance in the apertures 22, 23 being sufficient to permit insertion of the rods even at an angle.

A second mode of installation is that suggested by Fig. 1, where one of the rods has been driven first and then provided with the anchor plate serving as a guide for the upper end of the other rod.

The driving of a screw anchor having a rod threaded at its upper end involves special difficulties in the application of a wrench or power tool, having a socket, to the rod; and Figs. 4 and 5 show the driving adapter 31, comprising a steel member of non-circular shape, having a through bore 32 provided with internal threads fitting the threads 21 on the rod.

The non-circular exterior 33 of the adapter 31 may be of any desired shape; but the rectangular and square shapes are preferred because they provide the adapter with plane surfaces 34—37 of greater area than other shapes, such as hexagonal.

The heavy torque to which the adapter is subjected is less apt to deform the square adapter into a round shape than would be the case with adapters having a larger number of sides. Thus the end 38 of the adapter is preferably rectangular.

Threaded bore 32 in the adapter is adapted to receive the locking set screw 39, which may have a reduced non-circular or rectangular end portion 40 for receiving a wrench. The end 38 of the adapter is preferably chamfered, as indicated at 41, near its corners; and both the internal end 42 of the set screw and the outer end 43 of the rod are beveled or chamfered so that the locking pressure may not mash the ends of these parts into engagement with the threads of the adapter.

When the locking set screw 39 engages the end of the anchor rod, the adapter 31 is then fixedly secured on the anchor rod so that the anchor rod may be driven by means of a wrench or impact power torque tool, such as the pneumatic tool shown at 44 in Fig. 1.

After the anchor has been installed, the set screw 39 may be removed to relieve the locking pressure on the end of the guy rod; and then the adapter may be removed to be used again and again.

My method of installation of the anchoring assembly for pipe lines may be summarized as follows:

The pipe line is uncovered by digging sufficiently to expose the top of the pipe line; and guy rods of the screw type are successively provided with a non-circular wrench engaging adapter, locked in place by a second locking threaded member.

The screw anchors are driven into the earth at points adjacent the pipe line so that their upper ends will be so located as to pass through the apertures of an anchor bracket formed with a round portion for engaging the pipe line between the two anchors.

Threaded members are placed on the anchor rods above the bracket, and are drawn down and locked in position to cause the bracket to engage the pipe line to hold it against vertical outward movement.

The pipe line is preferably protected by a curved pad between the bracket and pipe. Such an arrangement permits the most economical anchoring of the pipe line to prevent it from moving out of the ground, while still permitting it to expand or contract relative to the anchoring installation, which may involve sliding movement between the anchor plate and pipe.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A screw anchor assembly, comprising a steel guy rod having a pointed end and a cylindrical body, said body supporting a radially extending partially helical screw flange adjacent to and guided by said pointed end, said guy rod being elongated at one end, and provided with a threaded end portion, chamfered at its end to avoid damage to threads by end pressure, an adapter member for driving said screw anchor into the ground, comprising a steel body, externally polygonal shape, having plane sides adapted to be received in a socket wrench, said adapter having an axial through bore internally threaded to receive the threaded end portion of said guy rod and said adapter body being elongated axially to receive a substantial length of said threaded portion, a locking plug of steel having a cylindrical threaded body and a non-circular head adapted to be received in a socket wrench, said plug fitting the internal threads of said adapter, and being chamfered at its end to avoid thread damage, said plug driven home against the threaded end of said guy rod, fixedly securing the adapter on the end of the guy rod, to drive the screw anchor by torque applied by the adapter, said adapter being readily releasable and removable by first removing the threaded plug.

2. A screw anchor assembly according to claim 1 in which a socket wrench has its socket receiving and driving said adapter and the socket wrench is secured on the shaft of a screw anchor driving motor.

References Cited in the file of this patent

UNITED STATES PATENTS

| | | |
|---|---|---|
| 1,576,677 | Scheibeler | Mar. 16, 1926 |
| 1,940,938 | Chance | Dec. 26, 1933 |
| 2,186,482 | Frank | Jan. 9, 1940 |
| 2,474,920 | Stearns | July 5, 1949 |
| 2,546,502 | Harrington | Mar. 27, 1951 |
| 2,569,528 | Kandle | Oct. 2, 1951 |
| 2,759,360 | Budnick | Aug. 21, 1956 |